(12) United States Patent
Menard et al.

(10) Patent No.: US 10,207,288 B2
(45) Date of Patent: Feb. 19, 2019

(54) TOOL AND METHOD FOR APPLYING AN ANTI-CORROSION SUBSTANCE TO AN AIRCRAFT PASSENGER SEAT RAIL

(71) Applicant: AIRBUS OPERATIONS (S.A.S.), Toulouse (FR)

(72) Inventors: Christophe Menard, Saint Andre Des Eaux (FR); Nicolas Blond, Severac (FR)

(73) Assignee: Airbus Operations (S.A.S.), Toulouse (FR)

( * ) Notice: Subject to any disclaimer, the term of this patent is extended or adjusted under 35 U.S.C. 154(b) by 41 days.

(21) Appl. No.: 15/282,055

(22) Filed: Sep. 30, 2016

(65) Prior Publication Data

US 2017/0100739 A1    Apr. 13, 2017

(30) Foreign Application Priority Data

Oct. 7, 2015    (FR) ...................... 15 59554

(51) Int. Cl.
*B43M 11/02*    (2006.01)
*B05C 17/02*    (2006.01)
(Continued)

(52) U.S. Cl.
CPC ............ *B05C 17/0227* (2013.01); *B05C 1/02* (2013.01); *B05C 17/0205* (2013.01);
(Continued)

(58) Field of Classification Search
CPC ............ B05C 17/0227; B05C 17/0232; B05C 17/0308; B05C 17/02; B05C 17/03; B05C 17/0357; B64D 11/0696; B05D 1/28
See application file for complete search history.

(56) References Cited

U.S. PATENT DOCUMENTS 2,813,292 A * 11/1957 McLendon ......... B05C 17/0227
118/208
3,612,707 A * 10/1971 Herbrechter ........ B05C 17/0232
401/15
(Continued)

FOREIGN PATENT DOCUMENTS

DE    2332677        1/1974
GB    2172820        10/1986
GB    2380149 A  *  4/2003

OTHER PUBLICATIONS

French Search Report for Application No. 1559554 dated Jun. 1, 2016.

*Primary Examiner* — Jennifer C Chiang
(74) *Attorney, Agent, or Firm* — Jenkins, Wilson, Taylor & Hunt, P.A.

(57) ABSTRACT

A tool for applying a corrosion-protection substance to a rail for securing seats in an aircraft. The tool includes a component of elongate overall shape, with a base configured to slide along the rail, and a rollers support connected to the base. The tool also has an axle incorporated in the rollers support, which extends transversally with respect to the longitudinal direction of the component on each side of the rollers support, and rollers for applying the substance mounted on the transverse axle, one on each side of the component. The tool allows the substance to be applied effectively to the flange parts of the rail that is to be protected.

18 Claims, 8 Drawing Sheets

(51) Int. Cl.
  *B05C 17/035*  (2006.01)
  *B05C 1/02*  (2006.01)
  *B05C 17/03*  (2006.01)
  *B05D 1/28*  (2006.01)
  *B64D 11/06*  (2006.01)

(52) U.S. Cl.
  CPC ...... *B05C 17/0232* (2013.01); *B05C 17/0245* (2013.01); *B05C 17/03* (2013.01); *B05C 17/0357* (2013.01); *B05D 1/28* (2013.01); *B64D 11/0696* (2013.01); *B05C 17/02* (2013.01)

(56) References Cited

U.S. PATENT DOCUMENTS

2006/0292392 A1 12/2006 Froning et al.
2015/0251206 A1  9/2015 Burns \* cited by examiner

TOOL AND METHOD FOR APPLYING AN ANTI-CORROSION SUBSTANCE TO AN AIRCRAFT PASSENGER SEAT RAIL

CROSS-REFERENCE TO RELATED APPLICATION

This application claims the benefit of and priority to French patent application number 1559554 filed on Oct. 7, 2015, the entire disclosure of which is incorporated by reference herein.

TECHNICAL FIELD

The disclosure herein relates to a tool for applying a substance for protection against corrosion to a rail for securing seats in an aircraft.

It is known that aircraft seats are secured to rails which extend in the interior of the aircraft in order to put a plurality of passenger seats into place.

Each of these rails generally comprises a rack which is arranged longitudinally, and two flanges which extend laterally on both sides of the rack. Portions of floor which are designed to form jointly a cabin floor are arranged supported at one of their edges on the flanges of the rails, and are secured there.

However, the edges of the floors are not contiguous with the rack, and a free space thus remains between the rack and the edges of the portions of floor which cover the two flanges of the rail.

This space is designed to be filled with a sealing material, such as a mastic, in order to provide sealing between the portions of floor and the rails.

Since the assembly of the rails and the portions of floor is situated in an air-conditioned area of the aircraft, condensation is liable to form on the rails, and a phenomenon of corrosion of the rails occurs.

In order to avoid the occurrence of this phenomenon, a substance for protection against corrosion, such as a waterproofing substance, is applied manually on the rails, with the exception, however, of the areas of the rail which border the rack and the rack itself. During the application of the waterproofing substance, the areas of the rail which border the rack and the rack itself must be masked in order to prevent them from receiving the substance.

This process is not efficient since it is too time-consuming.

SUMMARY

An objective of the disclosure herein is to provide a tool and a method which make it possible to apply a substance for prevention against corrosion efficiently to a rail for securing seats in an aircraft.

According to one aspect, a subject of the disclosure herein is a tool for applying a substance for protection against corrosion to a rail for securing seats in an aircraft, the tool comprising a component of elongate overall shape that comprises:

a base configured to slide along the rail, and preferably along a rack of the rail; and a rollers support connected to the base and comprising at least one shaft which forms a rollers support, the at least one shaft extending transversely with respect to a longitudinal direction of the component, on both sides thereof, a plurality of rollers, such as for example two rollers, for applying the substance being mounted on the at least one shaft, one on each side of the component.

A tool of this type is particularly efficient, since, by two rollers impregnated with substance, it makes it possible to apply the substance simultaneously to the two flanges of a rail, while displacing the tool along the rail. More particularly, the substance is applied to the areas of the flanges where the rollers are positioned.

According to other possible characteristics, taken in isolation or in combination with one another:

the rollers are mounted spaced from the component;

the rollers support is mounted in a detachable manner relative to the base;

the tool comprises a grasping unit which is connected to the component in order to drive the component with a sliding movement along the rail;

the at least one shaft is mounted on the rollers support by at least one resilient part;

the tool comprises at least one tank which is designed to contain the substance for protection against corrosion, and is associated with the component such as to distribute the substance on the rollers;

the tool comprises one or a plurality of circuits in order to distribute the substance from the tank on the rollers;

the tool comprises at least one control part which can open or close the circuit(s) by command, in order to permit or interrupt the distribution of substance on the rollers;

the tool comprises at least one part for regulation of the flow of distribution of substance on the rollers;

the at least one part for regulation of the flow can regulate the flow according to the type of substance used, and/or can regulate the flow independently from one roller to the other;

the tool comprises at least one part for regulation of the position of the circuit(s) for distribution of the substance from the tank on the rollers, according to the diameter of the rollers.

According to another aspect, the disclosure herein relates to a method for application of a substance for protection against corrosion to a rail for securing seats in an aircraft, the rail comprising a central part which forms a rack and two lateral flanges, wherein the method uses the tool as described briefly above.

According to a possible characteristic, the tool is positioned above the rail while engaging the base in the rack, such that the rollers which are mounted transversely and are impregnated with substance are opposite the lateral flanges of the rail, the tool then being displaced along the rail such that the rollers impregnated with substance are supported on the flanges, and roll on the latter in order to deposit the substance on the flanges.

According to yet another aspect, the disclosure herein relates to a rail for securing aircraft seats, wherein the rail is protected against corrosion by the substance applied according to the method as described briefly above.

BRIEF DESCRIPTION OF THE DRAWINGS

Other characteristics and advantages will become apparent during the following description, provided purely by way of non-limiting example, and with reference to the appended drawings, in which.

DETAILED DESCRIPTION

Figure 1:
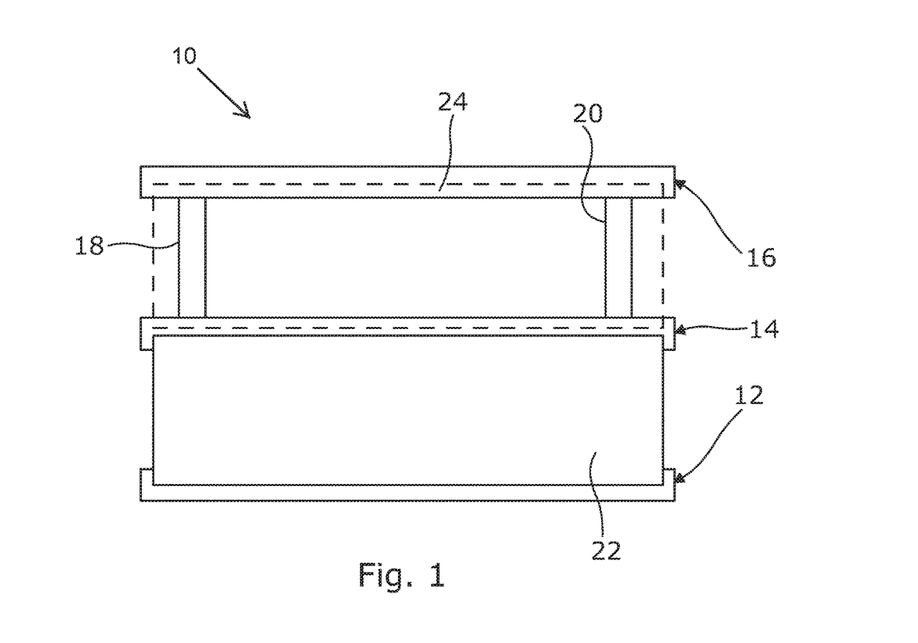
FIG. 1 illustrates schematically, according to one embodiment, an assembly of rails for securing aircraft seats on which portions of floor are secured.

As represented in FIG. 1, and designated by the general reference indicated as 10, an aircraft structure comprises an assembly of aircraft seat securing rails 12, 14, 16 (only three rails are represented, but the structure can comprise a different number of them), which are parallel to one another and spaced. The rails are supported on longitudinal support elements such as longitudinal bars 18, 20.

Before putting a floor into place on the rails, a substance for protection against corrosion is applied to these rails, as explained hereinafter. After application of this substance and drying, portions of floor such as the portion 22 are positioned supported on the lateral edges of two adjacent rails (the rails 12, 14 for the portion 22), and are secured on the latter. Another, adjacent portion of floor 24 is represented in broken lines in position on the lateral edges of the two adjacent rails 14 and 16.

The assembly of the portions of floor thus assembled forms a floor, in particular an aircraft cabin floor.

Figure 2:
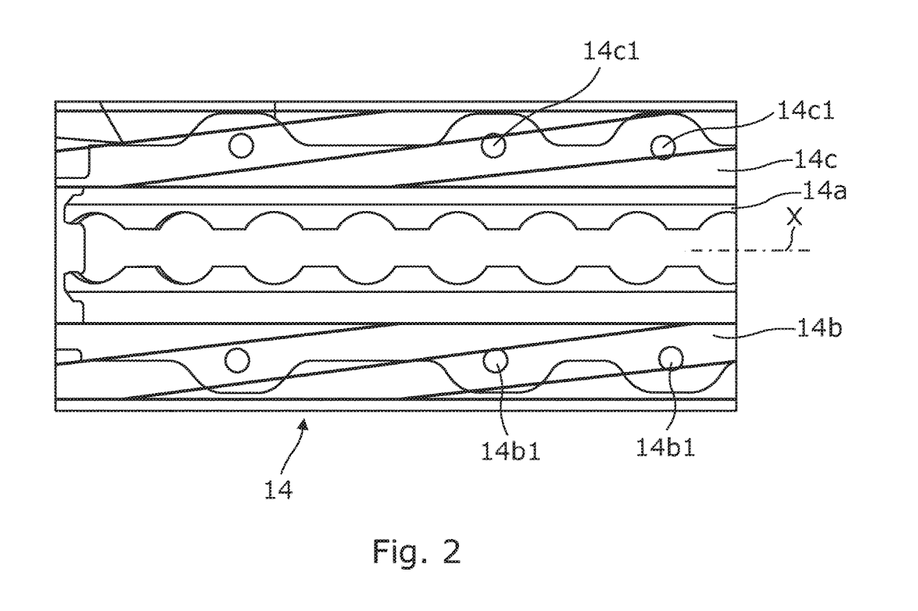
FIG. 2 is an enlarged schematic view of one of the rails for securing aircraft seats in FIG. 1.

FIG. 2 represents an example of a structure of the rails in FIG. 1, and, by way of example, the rail 14.

The rail 14 comprises a central part 14a formed by a rack which is arranged longitudinally (longitudinal axis X), and two flanges 14b, 14c, which extend laterally on both sides of the rack 14a, while being connected to the latter.

The form of the rack is configured to receive feet of seats, and to retain them securely. However, other forms of racks not represented are envisioned. The flanges 14b, 14c of the rail are provided respectively with holes 14b1, 14c1 which are used for the subsequent securing of the portions of floor.

Figure 3:
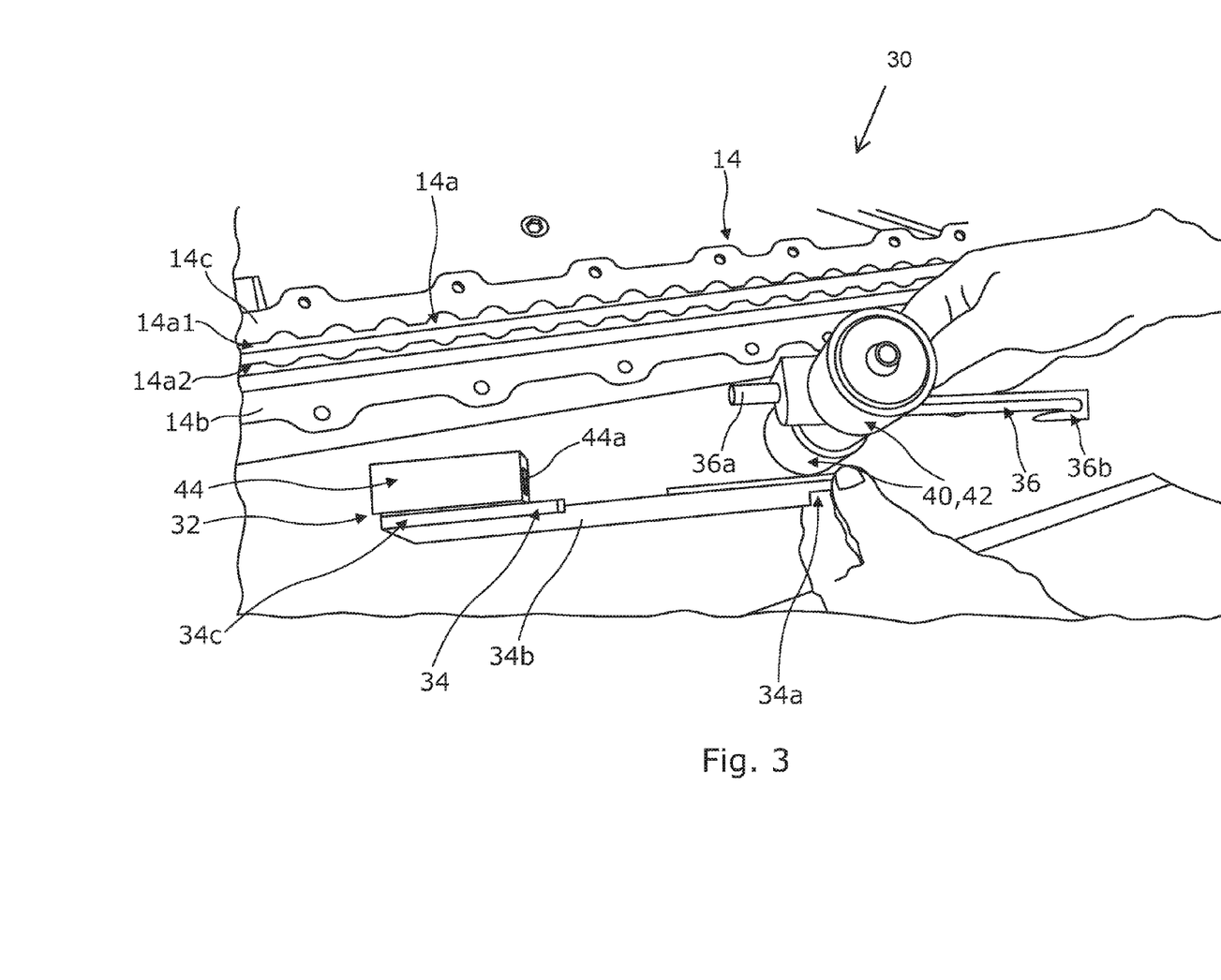
FIG. 3 is a general schematic view of a tool for applying an anti-corrosion substance according to a first embodiment, in a dismantled position in front of the rail in FIG. 2.
Figure 4:
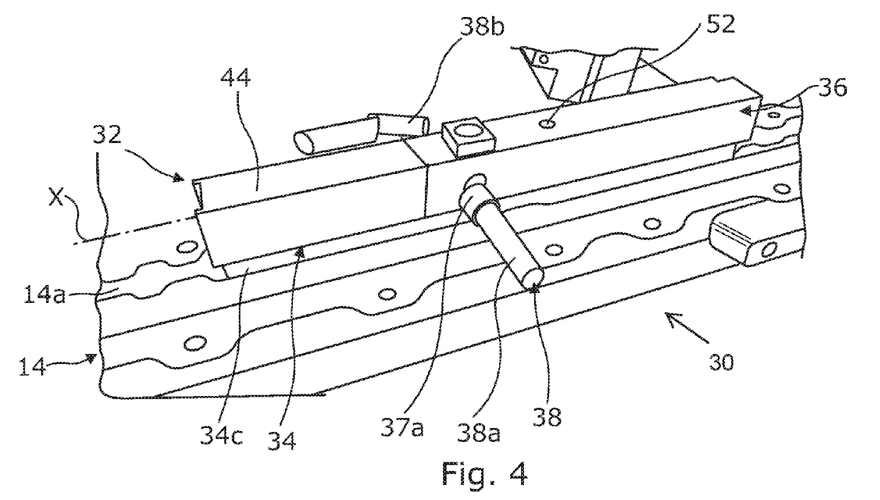
FIG. 4 is a schematic view of part of the tool in FIG. 3, mounted on the rail in FIG. 2.

FIGS. 3 and 4 represent a tool 30 for applying a substance for protection against corrosion according to a first embodiment of the disclosure herein. The tool 30 comprises a component 32 of elongate overall shape, which in use is designed to be installed on the rail 14, and more particularly in the rack 14a, for the purpose of its displacement along the rack. The component 32 comprises more particularly:

a base 34 configured to slide along the rail 14;

a rollers support 36 which is connected to the base 34 in a detachable manner, and comprises at least one shaft 38 forming a rollers support (shown in FIG. 4). The at least one shaft 38 is designed to receive two rollers (shown in FIG. 3) for application of the anti-corrosion substance to the flanges of the rail. The at least one shaft 38 extends transversely with respect to the longitudinal direction (axis X) of the component 32, on both sides of the latter, in the form of two portions of shaft 38a, 38b (FIG. 4).

In the example illustrated, the rollers support 36 comprises a single shaft 38 which passes through the width of the support. The two portions of shaft 38a, 38b (FIG. 4) which extend on both sides of the support are two spaced components of the same shaft. The central portion of the shaft 38 which connects the two portions 38a-b is arranged inside the support 36.

In FIG. 3, the component 32 is shown being handled by a user, with the rail 14 in the background.

The component 32 is thus formed in two parts:

a first part which is the rollers support 36 (in this case represented with two rollers 40, 42 mounted on the portions of shaft 38a-b); and a second part which comprises the base 34 and a unit 44 for receipt of the rollers support 36. The receipt unit 44 is secured on the base 34, above the latter.

The rollers support 36 is mounted in a detachable manner on the second part 34, 44. As represented in FIG. 3, this mounting makes it possible to remove the support 36 from the component 32, and to reposition it above according to the requirements of use.

For this purpose, the component 32 in FIG. 3 comprises engagement elements which are complementary to one another respectively on the rollers support 36 and on the receipt unit 44. These engagement elements make it possible simply, firstly to connect the support 36 and the unit 44 mechanically together, and secondly to separate them from one another.

In the example illustrated, the rollers support 36 comprises a shaft 36a which projects from one of the so-called front faces of the rollers support, in the manner of a tenon or spur. The receipt unit 44 for its part comprises a receptacle or mortise 44a. This receptacle is provided in the front face of the unit 44, which face is arranged opposite, and corresponding to the front face of the rollers support 36. This receptacle makes it possible to receive the shaft 36a, and thus to fit the two elements together. A part for securing of the two components is designed to block them relative to one another and prevent their untimely separation. This part is represented partially in FIG. 7, which will be described hereinafter. The part is for example a knurled screw 41 which is provided on one of the lateral faces of the receipt unit 44, and locks the shaft 36a in translation by being supported on the latter. For example, the screw 41 blocks the shaft 36a by engaging in a flattened part, not represented, which is provided on the shaft. FIG. 4 shows the tool installed on the rail (without the rollers), with the rollers support 36 connected mechanically to the receipt unit 44.

The rollers support 36 also comprises in its rear part, opposite the front part which supports the shaft 36a, element 36b which forms a return, facing towards the front part. This return is designed to be engaged by sliding below a recessed rear part 34a of the base 34, in order to block the support 36 at the rear, and thus prevent it from being raised.

The base 34 is configured to be inserted in the interior of the rack 14a by a central portion 34b in the form of a rib (FIG. 3). The central portion 34b has a form which is complementary to that of the opening 14a in the rack which is delimited by the edges opposite 14a1, 14a2. The central portion 34b is inserted in the rack through its opening 14a. This arrangement thus allows the base 34 to slide in the rack under the action of an external thrust, while being guided. The base 34 has a configuration which is adapted to the structure of the rail. Above the central portion 34b in the form of a rib, the base 34 also comprises a widened portion 34c on which the receipt unit 44 and the rollers support 36 are supported. This widened portion 34c is supported on the spaced edges opposite 14a1, 14a2 of the rack, as illustrated in FIG. 4.

Figure 5:
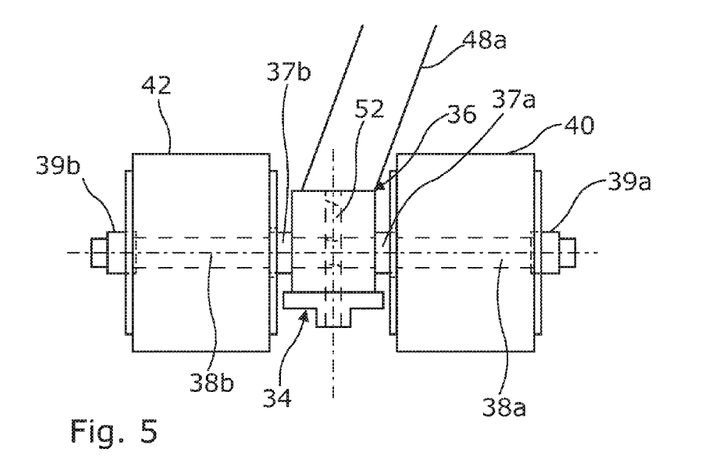
FIG. 5 is a front view, shown according to the longitudinal axis of the component, of the rollers support of the tool in FIG. 3.

FIG. 5 represents the rollers support 36 equipped with its rollers 40, 42 mounted on the respective portions of shaft 38a, 38b of the shaft 38 which pass through the support. Two parts which form stops or braces 37a, 37b are mounted respectively detachably on each of the portions of shaft 38a, 38b, against the central component of the rollers support 36, before the rollers 40, 42 are mounted on these same portions of shaft. Thus, each stop 37a-b is interposed between the support and a roller. This arrangement defines and sets the transverse position of each roller spaced from the support 36, and thus the spacing between the rollers.

Thanks to these stops, the rollers will thus be positioned on the flanges of the rails which are to be protected, at the required distance from the rack of these rails, as will be seen hereinafter.

Since the stops are removable, the spacing between the rollers can be modified simply, by replacing the stops by other stops with a different width or axial dimensional (taken in accordance with the shaft 38).

Figure 7:
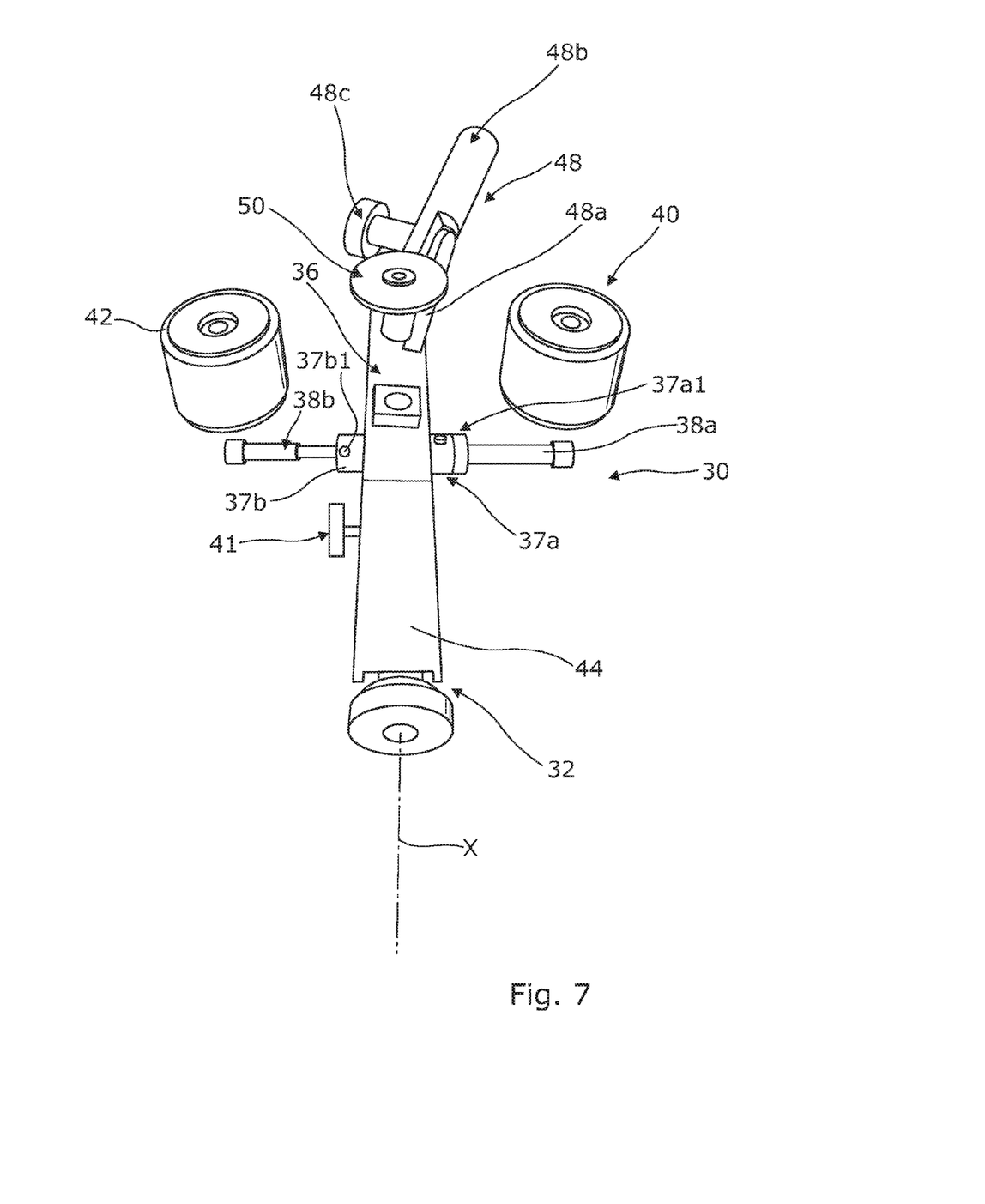
FIG. 7 is a general schematic view in perspective of the tool in FIG. 3, assembled but for the rollers and provided with a handle for use.

By way of example, each part which forms a stop 37a-b is a removable washer which is retained in a fixed position on a portion of shaft by a tightening screw 37a1, 37b1 (FIG. 7). Nuts 39a, 39b for tightening of the rollers are mounted respectively at the end of the portion of shaft 38a, 38b (FIG. 5).

Figure 6:
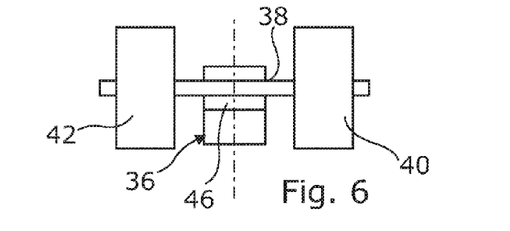
FIG. 6 is a schematic view in transverse cross-section of a possible mounting of a rollers support shaft in FIG. 5.

FIG. 6 illustrates schematically a possible mounting of the shaft 38 (or of the shafts, if there is a plurality of them) on the rollers support 36 by one or a plurality of resilient parts 46, such as one or a plurality of springs, in the interior of the central component of the support. The presence of a resilient part 46 makes it possible to compensate for the vertical and horizontal movements of the shaft 38 produced by an irregular thrust by the user on the rollers support.

FIG. 7 represents the tool 30 according to the embodiment in the preceding figures, provided with a grasping/handling part 48 such as a handle for the use of the tool (operator). The grasping part 48 is mounted detachably on the rollers support 36, for example by a securing element 50 which passes through a so-called securing part 48a of the part 48. The part 48a is mounted in a fixed manner on the support 36. The other part 48b of the part 48 forms the handle which the user grasps. The securing element 50 penetrates in the securing hole 52, which is represented in FIGS. 4 and 5, without the securing element 50. The securing element 50 is for example a regulation and blocking screw provided with an upper wheel for its mounting and dismantling, and the hole 52 is a tapped hole.

The grasping part 48 is positioned skewed relative to the longitudinal axis X of the component 32. In fact, the user of the tool is positioned to the side of the tool and of the rail for securing of seats, for the application of the substance on the flanges of the rail. The orientation of the part 48b of the grasping part 48 can be adjusted since this part is articulated on the part 48a. A blocking element 48c such as a screw makes it possible to position the two parts relative to one another in a fixed manner, with the required orientation.

FIGS. 8a through 8e are schematic views showing a plurality of successive steps of use of the tool 30 (without the grasping part, for the sake of clarity of the figures). These are steps of a method for application of an anti-corrosion substance to a rail for securing seats in an aircraft according to an embodiment of the disclosure herein. A logic diagram in FIG. 9 represents different steps of the method.

Figures 8A, 8B, 8C, 8D:
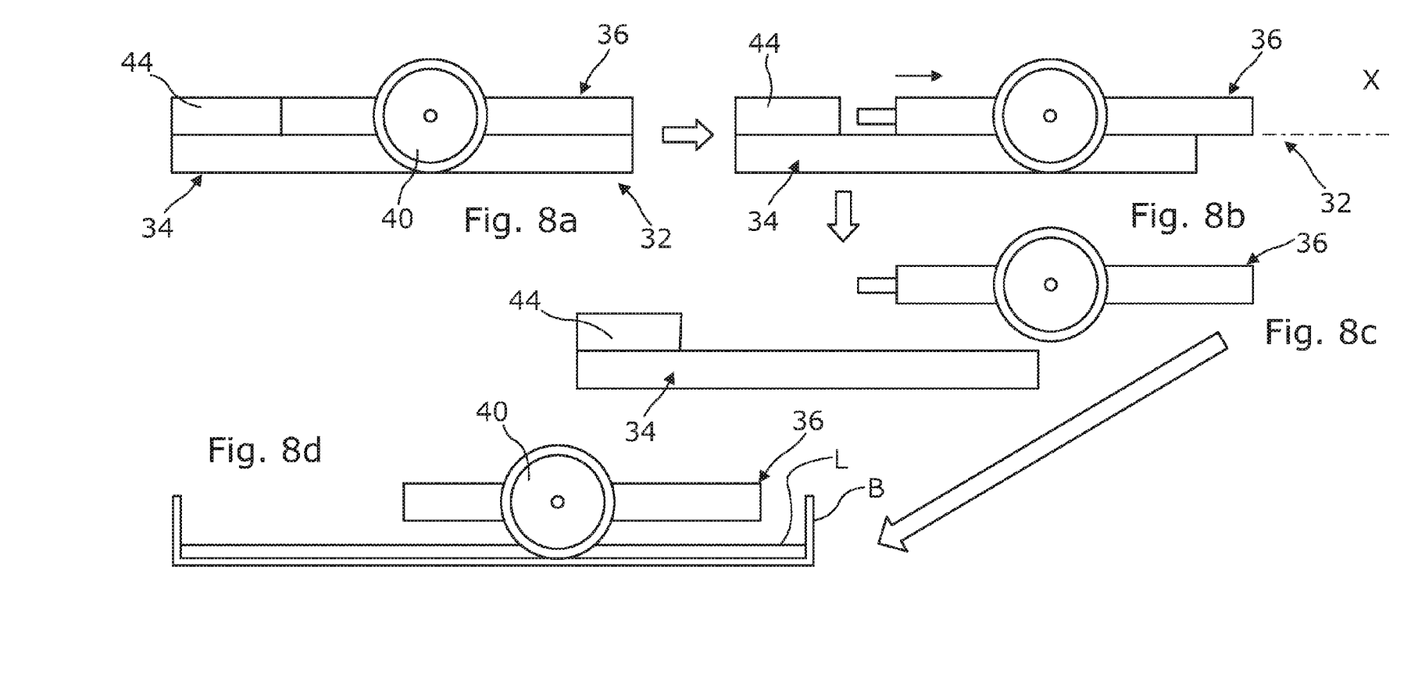
FIGS. 8a through 8e are schematic views showing a plurality of successive steps of use of the tool in the preceding figures, according to a method in accordance with an embodiment of the disclosure herein.

In FIG. 8a, the tool 30 is in the assembled position (rollers support 36 mounted on the base 34 and secured on the receipt unit 44). Either the tool is already in place on a rail 14, or the tool is not installed on the rail.

Figure 9:
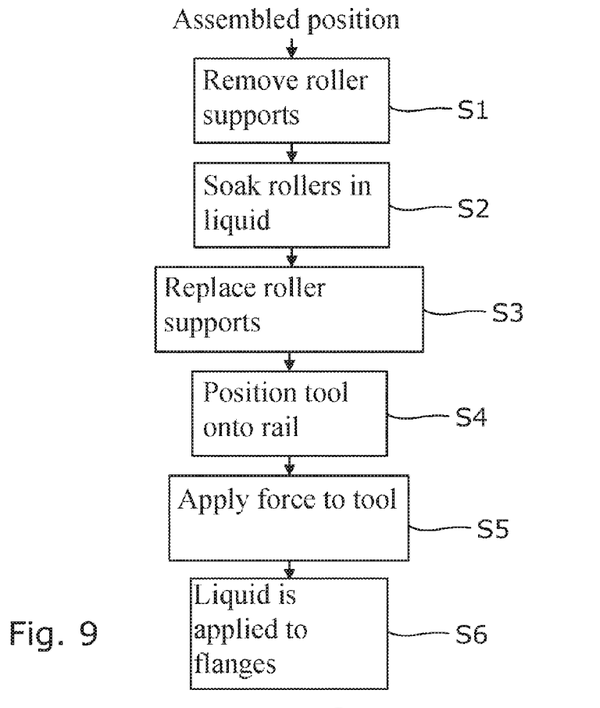
FIG. 9 is a logic diagram illustrating the steps of a method for applying an anti-corrosion substance to a rail for securing aircraft seats according to an embodiment of the disclosure herein.

The first step S1 of the method illustrated in FIG. 9 involves dismantling of the component 32. The rollers support 36 is spaced from the receipt unit 44 by sliding according to the longitudinal axis X (FIG. 8b), after having unlocked the two elements via the part 41. The rollers support 36 is then separated from the component 32 (FIG. 8c).

After this step, the rollers support 36 is placed in a container or tank B containing a liquid substance L which is designed to protect the rails against corrosion, such as a waterproofing substance. The rollers (only the roller 40 is represented) are dipped in the substance L in order to impregnate them with it (FIG. 8d) during the step S2.

The rollers support 36 equipped with its rollers impregnated with substance is then ready for use. It is repositioned on the base 34 of the component 32 (step S3) by carrying out the steps which are the inverse of those described above with reference to FIGS. 8a through 8c.

Figure 8E:
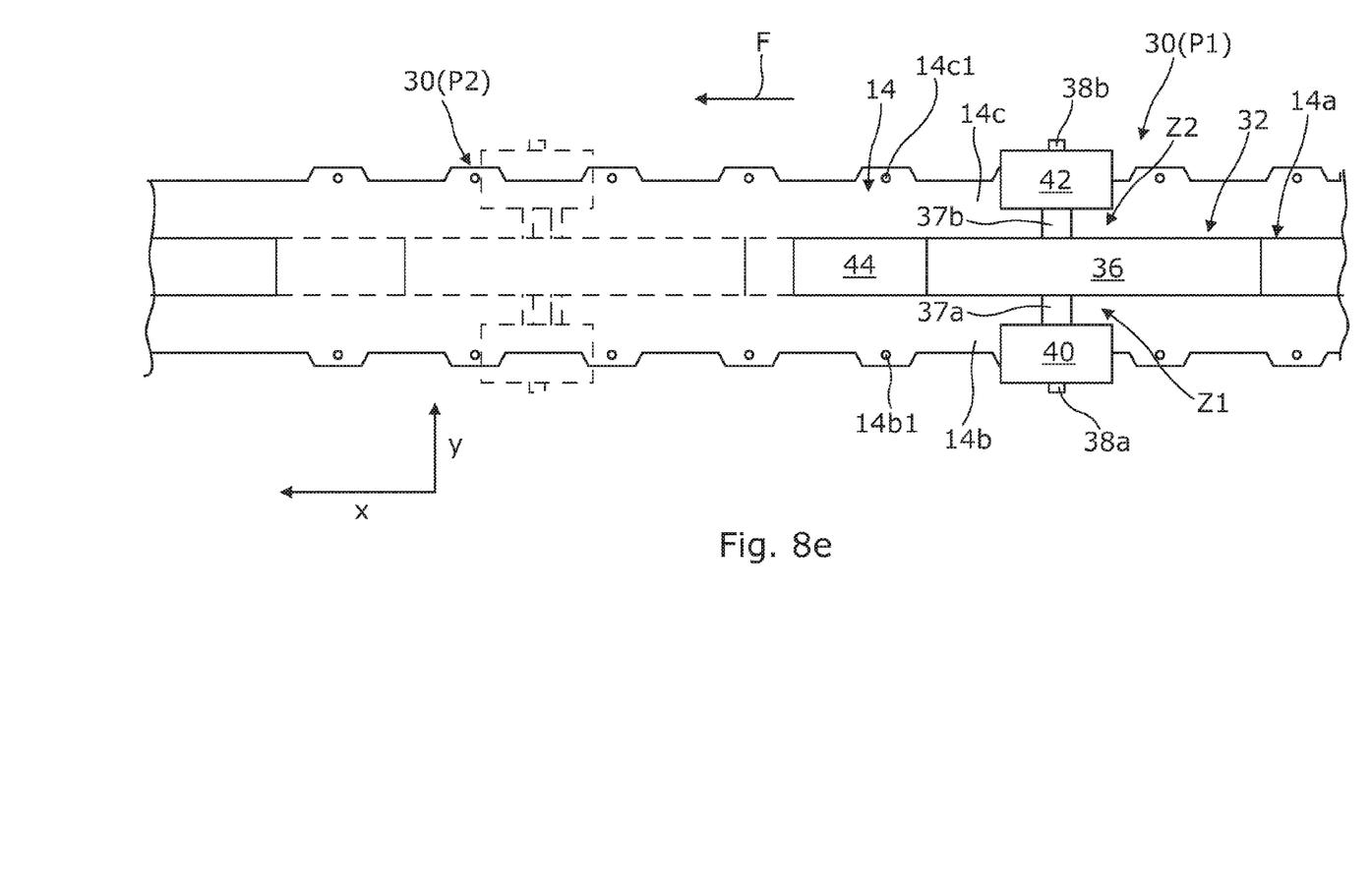

If the tool is not already installed on the rail, the user positions the tool above the rail. The user engages the central rib 34b between the spaced edges 14a1, 14a2 of the rack 14a (FIG. 3), such that the widened upper portion 34c of the base is supported on the edges 14a1, 14a2 (step S4 of putting into place on the rail). The width of the widened upper portion 34c is configured to be supported on the edges 14a1, 14a2 (FIG. 4), and to be able to slide on the latter. The rollers 40, 42 are thus positioned above and in contact with an end part of the lateral flanges 14b, 14c (FIG. 8e), but at a predetermined distance (e.g. 4 mm) from the outer edges of the rack 14a. This lateral positioning (offsetting) of the rollers is made possible because of the stops 37a-b, which leave clear on the lateral flanges a space or lateral area Z1, Z2 situated on both sides of the rack 14a (FIG. 8e). These two lateral areas Z1, Z2 border the rack along its entire length (axis X). The required width for the lateral areas Z1, Z2 (axis Y) determines the dimensions (width) of the stops 37a-b.

The lateral flanges 14b, 14c thus each comprise:
  firstly an end part which includes the free edge of the flanges and the securing holes 14b1 and 14c1, and receives a roller impregnated with substance for protection against corrosion 40 or 42; and
  secondly, the lateral area Z1 or Z2 adjacent to the rack, which is not in contact with the roller, and is therefore not protected against corrosion.

Subsequently, a sealing material or equipment will be put into place on each non-protected lateral area, between the rack of the rail and the two adjacent portions of floor.

The tool 30 is displaced along the rail according to the arrow F under the action of a thrust force by the user, which is exerted via the grasping part 48 in FIG. 7 (step S5). The thrust force is applied both longitudinally and from the top downwards in order to exert pressure on the rollers so that the substance is applied efficiently to the rails. During this displacement, the rollers turn around their respective portion of shaft 38a, 38b. By turning, they apply the protective substance to the end parts of the flanges of the rail (step S6), with the exception of the two aforementioned lateral areas Z1, Z2 which border the rack.

In FIG. 8e, the tool 30 is represented in two positions along the rail, i.e. a position P1 and a subsequent spaced position P2 illustrated in broken lines.

The rail is thus treated along its entire length, such that the end parts of the flanges are covered with substance, and therefore protected against corrosion.

If the rail cannot be treated in a single operation because of a lack of substance on the rollers, the steps described with reference to FIGS. 8a through 8d are executed once more, in order to reload substance on the rollers for a further application.

The tool 30 is particularly simple to use, and makes it possible to apply a protective substance simply and efficiently to the required parts of the flanges of the rails, in difficult conditions of work (e.g. the absence of a floor poses problems of safety for the operators). The time necessary for the application of the substance is thus greatly reduced in comparison with the prior art.

The design of the tool makes it possible to position the rollers systematically at the required distance from the outer edges of the rack of a rail, as soon as the tool is put into place on the rail. This makes it unnecessary to protect both the lateral areas Z1, Z2 of the rail adjacent to the rack, and the rack itself, against application of the substance. It is therefore not necessary to use protective consumables such as masking strips in order to protect the aforementioned areas against the anti-corrosion treatment. The tool can also be applied to other parts of the aircraft in which an identical problem applies.

The design in two parts of the component 32 which forms the tool makes it possible to leave the tool in place on the rail, and to take away only the removable part 36 which forms the rollers support. As a result, this also facilitates the operation of dipping the rollers in the container of substance, since dipping the base 34 of the component 32 as well is avoided.

According to a second embodiment illustrated in FIGS. 10 through 13, a tool 60, which again has the characteristics of the tool 30 previously described, additionally comprises a tank 62 of protective substance L which is associated with the component 32, in order to distribute the substance directly on the applicator rollers 40, 42 by one or a plurality of distribution circuits. The elements of the tool 30 which are included again in these figures retain the same references.

Figure 10:
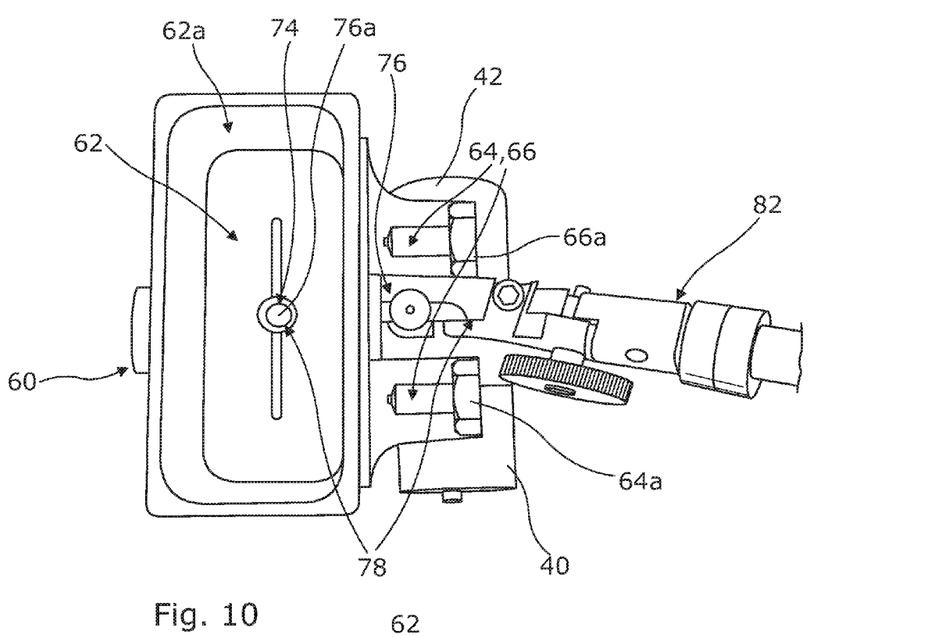
FIG. 10 is a view from above of a tool equipped with a tank according to a second embodiment of the disclosure herein.

In FIG. 10, the tank 62 is open in its upper part, and is provided on the exterior, on one of its outer faces, with distribution channels or chutes 64, 66. These channels 64, 66 connected to the tank are inclined towards the rollers (FIGS. 11 and 12).

Figure 11:
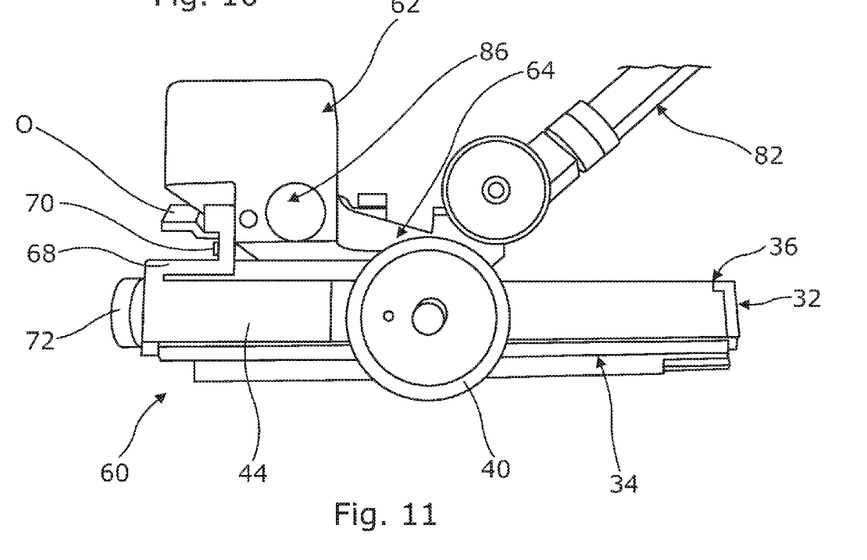
FIG. 11 is a side view of the tool in FIG. 10.

The tank is mounted on the component 32 by a connection component 68 (FIG. 11). The component 68 is secured firstly on the tank 62 at a first end, in particular below the latter, so that the latter is supported above it, and secondly on the component 32, in particular on the receipt unit 44, at an opposite end. Respective parts 70, 72 for securing the connection component 68 on the tank 62 and on the unit 44 are engaged in corresponding securing holes in the connection component 68, the tank 62 and the unit 44. The securing parts 70, 72 are for example knurled screws for clamping of the connection component 68 on the tank 62 and on the unit 44.

The tank is thus positioned above the component 32 in a manner which is offset longitudinally relative to the rollers 40, 42, such that the end 64a, 66a of the channels 64, 66 which opens out is arranged plumb with the rollers (FIG. 10).

Figures 12, 13:
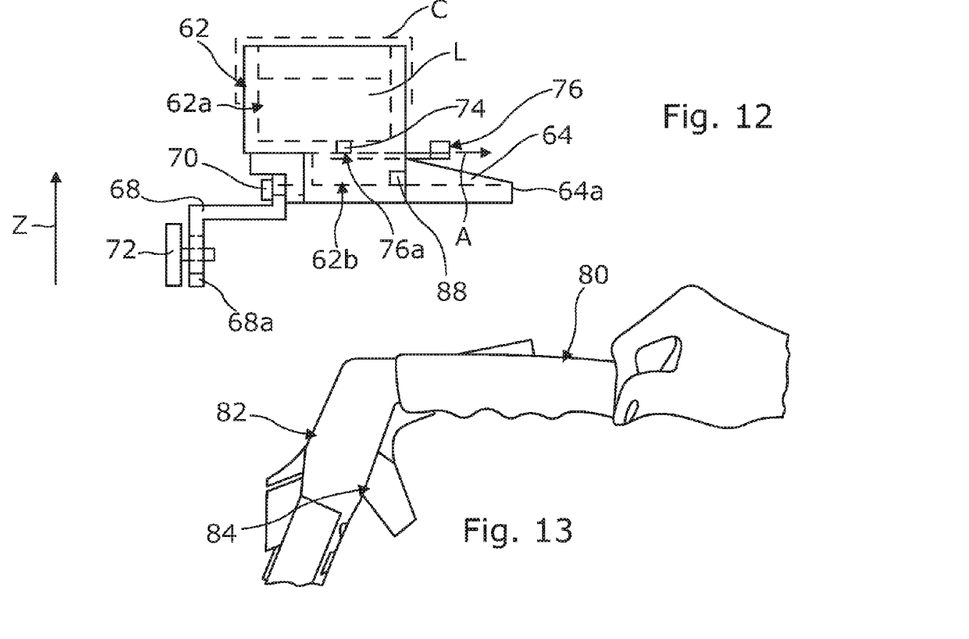
FIG. 12 is a schematic side view of the tank in FIG. 11.
FIG. 13 is a partial view of the free end of an arm and of a handle for grasping the tool according to the second embodiment of the disclosure herein.

FIG. 12 represents the tank and its channels in side view, with internal elements in broken lines.

Thus, the tank 62 comprises a main chamber 62a which contains the substance L and is open at the top, as well as a secondary chamber 62b which is situated below, and communicates with the outer channels 64, 66.

The two inner chambers 62a, 62b communicate with one another by an opening 74 which is provided in the base of the main chamber 62a (FIGS. 10 and 12).

A shutting unit 76 which can be activated from the exterior of the tank penetrates into the latter, into the interior of the secondary chamber 62b. The free end 76a of the part 76 shuts the opening 74 as illustrated in FIGS. 10 and 12.

The part 76 is a control part which, in the non-activated position (position of rest) shuts the opening 74, thus preventing the distribution of substance. In the activated position (traction according to the arrow A in FIG. 12), the part 76 permits the flow of the substance from the chamber 62a into the chamber 62b, and into the channels 64, 66. The path which is taken by the substance starting from the chamber 62a, and as far as the end 64a, 66a of the parallel channels which opens out, forms two distribution circuits. The secondary chamber 62b forms a part which is common to the two circuits.

In this second embodiment, a grasping part (e.g. a handle) 80 of the tool 60 (FIG. 13) is mounted on an arm 82 which is connected to the component 32 of the tool. This arm is mounted in a manner which can be oriented (by pivoting) on the component 32 of the tool, in order for the user to have greater ease of movement by being spaced from the tool and the rail (facilitated handling). The use of an arm of this type allows the operator to work at a distance, i.e. from an area of the aircraft in which a portion of floor is installed.

FIG. 10 illustrates a possible approach for activation of the control part 76. This approach involves a cable 78 which is connected to this part at one end. At its opposite end, the cable is connected to a maneuvering element 84 (e.g. a trigger) which is represented in FIG. 13, and the implementation of which makes it possible to exert traction on the cable 78, and thus on the part 76. Release of the maneuvering element 84 has the effect of releasing the traction which is exerted on the cable 78 and the control part 76, and thus of bringing the latter into a position of shutting the opening 74 (FIG. 12).

When rollers with different diameters must be installed on the rollers support shaft 36, instead of, and in the place of other rollers, the distance between the distribution channels and the rollers will therefore no longer be the same.

For this purpose, the tool can comprise at least one part for regulation of the position of the height of the channels 64, 66 of the tank 62 relative to the rollers, and therefore to the component 32.

More particularly, this embodiment involves the assembly formed by the securing part 72 and by the hole 68a with a form which is oblong according to its height (axis Z in FIG. 12). The oblong form permits different positionings of the part 72 according to the axis Z, thus defining different positions for the tank and the channels according to this same axis. This arrangement makes it possible to adapt the distance (height) between the distribution channels and the rollers in one direction or the other.

A part O which is arranged on the side of the tank 62 makes it possible to open and close the flow of the substance manually. The part is for example a butterfly valve. This part also makes it possible to regulate the flow according to the type of substance and its viscosity.

The tool also optionally comprises one or a plurality of parts for regulation of the flow of substance distributed to the rollers.

In this second embodiment, two parts for regulation of the flow are provided in order to regulate the flow to each of the channels 64, 66. In the example represented in FIG. 11, a single regulation part 86 is illustrated (the other one being concealed since it is arranged on the opposite lateral face of the tank). Each of the parts, which are independent from one another, permits independent regulation of the flow of substance in each distribution channel.

In this example, each regulation part is mounted on the tank 62, and for example can be activated from the exterior by an external part or head which can be activated. The part passes through the wall of the tank and penetrates into the secondary chamber 62*b* via a so-called active part (this part forms a punch for example). According to the axial position of the active part, the latter shuts to a greater or lesser extent the opening 88 (FIG. 12) which puts the chamber 62*b* and the channel 64 into communication. The principle is the same for the other regulation part not represented and the channel 66. The flow regulation parts are for example knurled screws.

Each regulation part can also comprise marks or references (or other signs or elements) which are representative of pre-regulated flows. When they are brought into correspondence with a mark or a reference on the tank (by rotation, or other displacement of the part), these marks or references ensure the flow of substance in the channel with the pre-regulated flow.

Optionally, a cover C is positioned and secured hermetically on the tank 62, in order to avoid any spillage of substance if the tool falls.

The tool 60 according to the second embodiment retains the advantages associated with the tool 30 of the first embodiment. The tool 60 according to the second embodiment makes it possible however to provide a source of substance on the tool itself, and not spaced from it. Manipulations of the tool (dismantling, etc.) in order to impregnate the rollers from a distant source of substance are thus avoided, consequently simplifying the work of the operators and saving time. As a result, only the steps S4 to S6 of the method in FIG. 9 are carried out.

The addition of a tank to the tool 30 in a detachable manner is particularly simple to carry out.

It will be noted that the parts for independent regulation of the flow make it possible to:

permit the flow of substance to a single one of the channels;

permit the flow of substance according to flows which are different from one channel to the other, simultaneously or not simultaneously.

According to a variant not represented, a tool for application of an anti-corrosion substance equipped with one or a plurality of tanks of substance can have a design which is simplified in relation to the tool 30. In fact, the presence of a tank makes it unnecessary to design the component 32 in two parts with the detachable rollers support. The rollers support and the receipt unit can therefore be formed in a single piece, optionally with the base.

According to a variant not represented, the rollers support according to the two preceding embodiments comprises two distinct shafts.

According to a variant not represented, the rollers support according to the two preceding embodiments comprises the receptacle 44*a*, and the receipt unit 44 comprises the shaft 36*a*.

According to a variant not represented, the two chambers 62*a* and 62*b* of the tank can form only a single chamber which opens directly onto the two channel 64, 66. The control part which can be activated from the exterior in order to permit the distribution of substance is then arranged at the opening, between the single chamber and the channels.

According to a variant not represented, the flow regulation parts are mounted on the distribution channels.

According to a variant not represented, the marks or references (or other signs or elements) which are representative of pre-regulated flows can be present on the tank instead of being present on the flow regulation part. The flow regulation part in turn then comprises only one distinctive element to be brought into correspondence with the mark or reference selected.

According to a variant not represented, the marks or references (or other signs or elements) which are representative of pre-regulated flows can be provided on the channels.

According to a variant not represented, the part 48*b* of the grasping part 48 according to the first embodiment can be provided at the end of an arm, such as the arm 82 according to the second embodiment.

While at least one exemplary embodiment of the present invention(s) has been shown and described, it should be understood that modifications, substitutions and alternatives may be apparent to one of ordinary skill in the art and can be made without departing from the scope of the disclosure described herein. This application is intended to cover any adaptations or variations of the specific embodiments discussed herein. In addition, in this disclosure, the terms "comprise" or "comprising" do not exclude other elements or steps, and the terms "a", "an" or "one" do not exclude a plural number. Furthermore, characteristics or steps which have been described with reference to one of the above exemplary embodiments may also be used in combination with other characteristics or steps of other exemplary embodiments described above.

The invention claimed is:

1. A tool for applying a substance for protection against corrosion to flanges of a rail for securing seats in an aircraft, the tool comprising an elongate overall shape that comprises:
    a base slidable along the rail;
    a rollers support detachably mounted to and supported by the base and comprising at least one shaft that extends transversely with respect to a longitudinal direction of the tool; and
    a plurality of rollers mounted on the at least one shaft, one roller on each side of the tool, for applying the substance.

2. The tool according to claim 1, wherein the rollers are mounted spaced from the tool.

3. The tool according to claim 1, wherein the base is insertable between the flanges of the rail.

4. The tool according to claim 1, wherein the tool comprises a grasping part connected to the tool in order to drive the tool with a sliding movement along the rail.

5. The tool according to claim 4, wherein the grasping part is mounted detachably on the rollers support.

6. The tool according to claim 1, wherein the at least one shaft is mounted on the rollers support by at least one resilient part.

7. The tool according to claim 1, wherein the tool comprises at least one tank to contain the substance for protection against corrosion, wherein the tank is configured to distribute the substance on the rollers.

8. The tool according to claim 7, wherein the tool comprises one or more circuits to distribute the substance from the tank on the rollers.

9. The tool according to claim 8, wherein the tool comprises at least one control part which can open or close the one or more circuits by command, in order to permit or interrupt distribution of substance on the rollers.

10. The tool according to claim 8, wherein the tool comprises at least one part for regulation of flow of distribution of substance on the rollers.

11. The tool according to claim 10, wherein the at least one part for regulation of the flow is configured to:
regulate the flow according to a type of substance used; and/or
regulate the flow independently from one roller to another roller.

12. The tool according to claim 8, comprising at least one part for regulation of a position of the one or more circuits for distribution of the substance from the tank on the rollers, according to a diameter of the rollers.

13. The tool according to claim 1, comprising removable stops mounted on the at least one shaft between the rollers support and the rollers, wherein the removable stops set the transverse position of the rollers.

14. The tool according to claim 1, comprising a receiving unit attached to the base and defining a receptacle for receiving and locking the rollers support.

15. The tool according to claim 14, wherein the base comprises a widened portion on which the receiving unit and the rollers support are disposed.

16. A method for application of a substance for protection against corrosion to a rail for securing seats in an aircraft, the rail comprising a central part which forms a rack and two lateral flanges, wherein the method uses a tool for applying a substance for protection against corrosion to a rail for securing seats in an aircraft, the tool comprising an elongate overall shape that comprises:
a base slidable along the rail; and
a rollers support detachably mounted to and supported by the base and comprising at least one shaft that extends transversely with respect to a longitudinal direction of the tool; and
a plurality of rollers for applying the substance being mounted on the at least one shaft, one roller on each side of the tool.

17. The method according to claim 16, wherein the tool is positioned above the rail while engaging the base in the rack, such that the rollers impregnated with substance are on opposite lateral flanges of the rail, the tool then being displaced along the rail such that the rollers are supported on the flanges and roll on the flanges to deposit the substance on the flanges.

18. A rail for securing aircraft seats, wherein the rail is protected against corrosion by the method for application, on the rail, of a substance for protection against corrosion according to claim 16.

* * * * *